US011416420B2

(12) United States Patent
Duval

(10) Patent No.: US 11,416,420 B2
(45) Date of Patent: *Aug. 16, 2022

(54) SECURE MEMORY SYSTEM PROGRAMMING

(71) Applicant: Micron Technology, Inc., Boise, ID (US)

(72) Inventor: Olivier Duval, Pacifica, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/107,215

(22) Filed: Nov. 30, 2020

(65) Prior Publication Data

US 2021/0081334 A1 Mar. 18, 2021

Related U.S. Application Data

(63) Continuation of application No. 16/052,215, filed on Aug. 1, 2018, now Pat. No. 10,853,273.

(51) Int. Cl.
*G06F 12/14* (2006.01)
*G06F 3/06* (2006.01)

(52) U.S. Cl.
CPC ........ *G06F 12/1466* (2013.01); *G06F 3/0622* (2013.01); *G06F 3/0659* (2013.01); *G06F 3/0679* (2013.01); *G06F 12/1408* (2013.01); *G06F 2212/1052* (2013.01); *G06F 2212/2022* (2013.01)

(58) Field of Classification Search
CPC ............. G06F 12/1466; G06F 12/1408; G06F 3/0622; G06F 3/0659; G06F 3/0679; G06F 2212/1052; G06F 2212/2022
See application file for complete search history.

(56) References Cited

U.S. PATENT DOCUMENTS 9,397,835 B1 * 7/2016 Campagna ............ H04L 9/0891
10,853,273 B2   12/2020 Duval
(Continued)

FOREIGN PATENT DOCUMENTS

CN      112654993       4/2021
JP      2006259952      9/2006
(Continued)

OTHER PUBLICATIONS

"International Application Serial No. PCT/US2019/044472, International Search Report dated Nov. 14, 2019", 3 pgs.
(Continued)

*Primary Examiner* — Nanci N Wong
(74) *Attorney, Agent, or Firm* — Schwegman Lundberg & Woessner, P.A.

(57) ABSTRACT

Various examples are directed to systems and methods for programming memory. A programming appliance may receive a command file comprising a first pre-generated digital signature. The first pre-generated digital signature may be associated with a memory system, with a first command and with a first memory system counter value. The programming appliance may send to a memory system a first command message. The first command system may comprise the first command and the first pre-generated digital signature.

20 Claims, 9 Drawing Sheets

(56) References Cited

U.S. PATENT DOCUMENTS

| | | | | |
|---|---|---|---|---|
| 2002/0078315 | A1* | 6/2002 | Howard | G06F 11/2064 |
| | | | | 711/162 |
| 2009/0170539 | A1 | 7/2009 | Kortge et al. | |
| 2010/0153732 | A1* | 6/2010 | Su | G06F 12/1408 |
| | | | | 713/176 |
| 2010/0312973 | A1 | 12/2010 | Galbo et al. | |
| 2012/0192293 | A1 | 7/2012 | Adkins et al. | |
| 2013/0159727 | A1 | 6/2013 | Sarangdhar et al. | |
| 2014/0044265 | A1 | 2/2014 | Kocher et al. | |
| 2015/0033035 | A1 | 1/2015 | Haid et al. | |
| 2016/0147586 | A1* | 5/2016 | Mayer | G06F 11/1004 |
| | | | | 714/37 |
| 2016/0344731 | A1* | 11/2016 | Serebrin | H04L 63/062 |
| 2016/0379015 | A1 | 12/2016 | Samsonov et al. | |
| 2018/0121096 | A1 | 5/2018 | Um | |
| 2018/0159692 | A1 | 6/2018 | Strong et al. | |
| 2019/0079831 | A1 | 3/2019 | Madduri et al. | |
| 2020/0042465 | A1 | 2/2020 | Duval | |

FOREIGN PATENT DOCUMENTS

| | | |
|---|---|---|
| JP | 2009199253 | 9/2009 |
| WO | WO-2020028550 A1 | 2/2020 |

OTHER PUBLICATIONS

"International Application Serial No. PCT/US2019/044472, Written Opinion dated Nov. 14, 2019", 5 pgs.

"International Application Serial No. PCT US2019 044472, International Preliminary Report on Patentability dated Feb. 11, 2021", 7 pgs.

U.S. Appl. No. 16/052,215, Non Final Office Action dated Oct. 18, 2019, 17 pgs.

U.S. Appl. No. 16/052,215, Response filed Jan. 20, 2020 to Non Final Office Action dated Oct. 18, 2019.

U.S. Appl. No. 16/052,215, Final Office Action dated Mar. 18, 2020, 22 pgs.

U.S. Appl. No. 16/052,215, Response filed May 12, 2020 to Final Office Action dated Mar. 18, 2020, 15 pgs.

U.S. Appl. No. 16/052,215, Advisory Action dated May 28, 2020, 4 pgs.

U.S. Appl. No. 16/052,215, Notice of Allowance dated Jul. 31, 2020. 12 pgs.

"European Application Serial No. 19844779.9, Response filed Sep. 20, 2021 to Communication pursuant to Rules 161(2) and 162 EPC dated Mar. 10, 2021", 17 pgs.

"European Application Serial No. 19844779.9, Extended European Search Report dated Mar. 4, 22", 10 pgs.

"Japanese Application Serial No. 2021-505424, Notification of Reasons for Refusal dated Mar. 22, 22", w English translation, 8 pgs.

"Korean Application Serial No. 10-2021-7005597, Notice of Preliminary Rejection dated Apr. 14, 22", w English translation, 8 pgs.

Wolfgang, Rankl, "Smart Card Handbook, 4th Edition", In: Smart Card Handbook, 4th Edition Wiley, Chichester, West Sussex, U.K, (Jul. 19, 2010), 348-350.

* cited by examiner

SECURE MEMORY SYSTEM PROGRAMMING

PRIORITY APPLICATION

This application is a continuation of U.S. application Ser. No. 16/052,215, filed Aug. 1, 2018, which is incorporated herein by reference in its entirety.

BACKGROUND

Memory systems are typically provided as internal, semiconductor, integrated circuits in computers or other electronic devices. There are many different types of memory, including volatile and non-volatile memory.

Volatile memory requires power to maintain its data, and includes random-access memory (RAM), dynamic random-access memory (DRAM), or synchronous dynamic random-access memory (SDRAM), among others.

Non-volatile memory can retain stored data when not powered, and includes flash memory, read-only memory (ROM), electrically erasable programmable ROM (EEPROM), static RAM (SRAM), erasable programmable ROM (EPROM), resistance variable memory, such as phase-change random-access memory (PCRAM), resistive random-access memory (RRAM), magnetoresistive random-access memory (MRAM), or 3D XPoint™ memory, among others.

Flash memory is utilized as non-volatile memory for a wide range of electronic applications. Flash memory systems typically include one or more groups of one-transistor, floating gate or charge trap memory cells that allow for high memory densities, high reliability, and low power consumption.

Two common types of flash memory array architectures include NAND and NOR architectures, named after the logic form in which the basic memory cell configuration of each is arranged. The memory cells of the memory array are typically arranged in a matrix. In an example, the gates of each floating gate memory cell in a row of the array are coupled to an access line (e.g., a word line). In a NOR architecture, the drains of each memory cell in a column of the array are coupled to a data line (e.g., a bit line). In a NAND architecture, the drains of each memory cell in a string of the array are coupled together in series, source to drain, between a source line and a bit line.

Both NOR and NAND architecture semiconductor memory arrays are accessed through decoders that activate specific memory cells by selecting the word line coupled to their gates. In a NOR architecture semiconductor memory array, once activated, the selected memory cells place their data values on bit lines, causing different currents to flow depending on the state at which a particular cell is programmed. In a NAND architecture semiconductor memory array, a high bias voltage is applied to a drain-side select gate (SGD) line. Word lines coupled to the gates of the unselected memory cells of each group are driven at a specified pass voltage (e.g., Vpass) to operate the unselected memory cells of each group as pass transistors (e.g., to pass current in a manner that is unrestricted by their stored data values). Current then flows from the source line to the bit line through each series coupled group, restricted only by the selected memory cells of each group, placing current encoded data values of selected memory cells on the bit lines.

Each flash memory cell in a NOR or NAND architecture semiconductor memory array can be programmed individually or collectively to one or a number of programmed states. For example, a single-level cell (SLC) can represent one of two programmed states (e.g., 1 or 0), representing one bit of data. However, flash memory cells can also represent one of more than two programmed states, allowing the manufacture of higher density memories without increasing the number of memory cells, as each cell can represent more than one binary digit (e.g., more than one bit). Such cells can be referred to as multi-state memory cells, multi-digit cells, or multilevel cells (MLCs). In certain examples, MLC can refer to a memory cell that can store two bits of data per cell (e.g., one of four programmed states), a triple-level cell (TLC) can refer to a memory cell that can store three bits of data per cell (e.g., one of eight programmed states), and a quad-level cell (QLC) can store four bits of data per cell. MLC is used herein in its broader context, to can refer to any memory cell that can store more than one bit of data per cell (i.e., that can represent more than two programmed states).

Some memory arrays are two-dimensional (2D) structures arranged on a surface of a semiconductor substrate. To increase memory capacity for a given area, and to decrease cost, the size of the individual memory cells has decreased. However, there is a technological limit to the reduction in size of the individual memory cells, and thus, to the memory density of 2D memory arrays. In response, three-dimensional (3D) memory structures, such as 3D NAND architecture semiconductor memory systems, are being developed to further increase memory density and lower memory cost.

Memory arrays or systems can be combined together to form a storage volume of a memory system, such as a solid-state drive (SSD), a Universal Flash Storage (UFS™) device, a MultiMediaCard (MMC) solid-state storage device, an embedded MMC device (eMMC™), etc. An SSD can be used as, among other things, the main storage device of a computer, having advantages over traditional hard drives with moving parts with respect to, for example, performance, size, weight, ruggedness, operating temperature range, and power consumption. For example, SSDs can have reduced seek time, latency, or other delay associated with magnetic disk drives (e.g., electromechanical, etc.). SSDs use non-volatile memory cells, such as flash memory cells to obviate internal battery supply requirements, thus allowing the drive to be more versatile and compact.

An SSD can include a number of memory devices, including a number of dies or logical units (e.g., logical unit numbers or LUNs), and can include one or more processors or other controllers performing logic functions required to operate the memory devices or interface with external systems. Such SSDs may include one or more flash memory die, including a number of memory arrays and peripheral circuitry thereon. The flash memory arrays can include a number of blocks of memory cells organized into a number of physical pages. In many examples, the SSDs will also include DRAM or SRAM (or other forms of memory die or other memory structures). The SSD can receive commands from a host in association with memory operations, such as read or write operations to transfer data (e.g., user data and associated integrity data, such as error data and address data, etc.) between the memory devices and the host, or erase operations to erase data from the memory devices.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
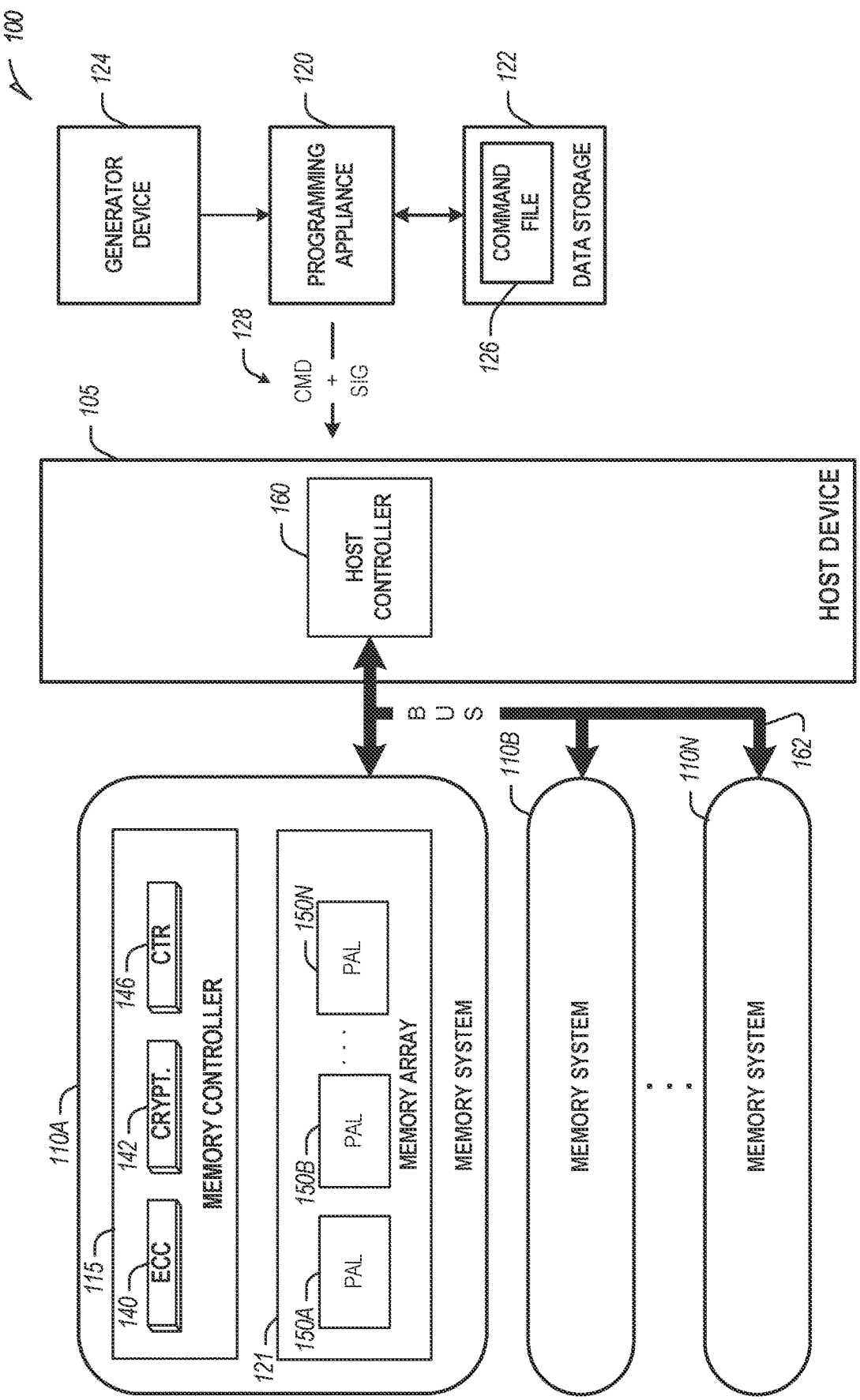
FIG. 1 illustrates an example of an environment including a host device, memory systems, and a programming appliance that includes a command file.

Aspects of the present disclosure are directed to secure memory system programming. During the production of memory systems and/or of host systems that utilize a memory system, it is often desirable to configure the memory system. A programming appliance can provide commands to the memory system that instruct the memory system to perform various operations and/or assume various configurations.

Some memory systems include security features that prevent the memory system from executing a command unless the command is accompanied by a valid digital signature. The memory system verifies the command by checking the validity of the digital signature. Memory system commands that are verified with a digital signature are referred to herein as signed commands. In some memory systems, all commands are signed commands. In other memory systems, less than all commands are signed commands. For example, commands that affect security features, device provisioning, and/or other sensitive areas of operation can be signed while routine commands, such as read or write requests, can be unsigned.

The digital signature accompanying a signed command can be created (and verified) using multiple input data elements including a cryptographic key and a memory system counter value. The digital signature can be created by a programming appliance or other suitable signing device, such as a hardware security module (HSM). The digital signature can be generated using a symmetric key arrangement or an asymmetric key arrangement. In a symmetric key arrangement, both the signing device that generates a digital signature and the memory system that verifies the digital signature use the same cryptographic key, which may be a server root key for the memory system. In an asymmetric key arrangement, the signing device utilizes a private key that may not be known to the memory system. The memory system utilizes a public key corresponding to the signing device's private key.

The digital signature can also be based on a counter value of a memory system counter. The signing device generating the digital signature can query the memory system to receive a current value of the memory system counter. The signing device generates the digital signature by executing a cryptographic function, such as a hash function, using a cryptographic key, the command, and the current memory system counter value. In a symmetric key arrangement, the signing device uses a secret cryptographic key that is known to the signing device and the memory device. In an asymmetric key arrangement, the signing device uses a private cryptographic key that is known to the signing device but may not be known to the memory system. A command message including the command and the digital signature is sent to the memory system.

The memory system verifies the digital signature by computing a cryptographic digest of the command from the command message, the current value of the memory system counter and a memory system cryptographic key. A cryptographic digest is the output of a hash function or other suitable cryptographic function that is executed at the memory system utilizing the command, the current value of the memory system counter, and the memory system cryptographic key.

In a symmetric key arrangement, the memory system cryptographic key is a copy of the cryptographic key used by the signing device. In an asymmetric key arrangement, the memory system cryptographic key is a public key of the signing device. If the cryptographic digest is equivalent to the digital signature included with the command message, then the digital signature is verified and the memory system executes the command. If the cryptographic digest is not equivalent to the digital signature included with the command message, then the digital signature is not verified and the memory system does not execute the command.

As described, a device, such as a programming appliance, can instruct a memory system to execute a signed command if the device and the memory system have a complimentary set of cryptographic keys, e.g., the device and memory system have the same symmetric key or the device has a private key and the memory system has the corresponding public key.

In some examples, however, providing the programming appliance with a copy of either a symmetric key known to the memory system or a private key associated with a public key known to the memory system can create challenges. For example, an unauthorized actor who steals the cryptographic key from the programming appliance (e.g., symmetric key or private key) can later compromise the memory system by generating signed commands with valid digital signatures. This challenge is multiplied in environments where a single programming appliance programs multiple memory systems, for example, at multiple host devices. In that case, the programming appliance manages multiple cryptographic keys for the multiple memory systems.

The programming appliance can be implemented with security features to limit unauthorized access to cryptographic keys. For example, the programming appliance may be or include a hardware security module (HSM) that limits physical and network access to the cryptographic keys that it stores. Increasing the security of the programming appliance, however, still generates challenges. For example, programming appliances with HSMs or other suitable security features can be costly to purchase, operate, and maintain. This can limit the feasibility of implementing programming appliances at distributed locations. Also, even if suitable security is used, providing the cryptographic keys to multiple programming appliances increases the number of people and facilities that should be trustworthy to avoid security breaches.

Various examples described herein address these and other challenges by providing secure memory system programming, for example, utilizing a command file including one or more pre-generated digital signatures. The pre-generated digital signatures can be used by the programming appliance to program one or more memory systems. In this way, the programming appliance may not need to receive a cryptographic key in order to program the memory system. Instead, the programming appliance uses the pre-generated digital signatures from the command file to send command messages to the memory system.

A pre-generated digital signature is generated by an HSM or other suitable generator device. The pre-generated digital signature corresponds to a particular memory system, a signed command, and a selected value of the memory system counter. The selected value of the memory system counter can be a value that the memory system counter is expected to have when the pre-generated digital signature is used. For example, as described herein, the selected value of the memory system counter can be a known initial value of the memory system counter, a predetermined number of increments greater than the known initial value, and/or a value to which the programming appliance is able to increment the memory system counter. The signed command is the command that can be executed using the pre-generated signal. The generator device creates the pre-generated digital signature by executing a cryptographic operation using the signed command, the selected memory system counter value, and the cryptographic key associated with the particular memory system (e.g., a symmetric key or private key).

The programming appliance receives the command file and uses the pre-generated digital signature to create a command message. The command message includes the signed command and the pre-generated digital signature. The memory system verifies the pre-generated digital signature using its memory system cryptographic key (e.g., a public key or symmetric key) and the signed command from the command message.

In some examples, the programming appliance determines that the current memory system counter value matches the selected memory system counter of the pre-generated digital signature, for example, by querying the memory system or incrementing the memory system counter, as described herein.

The command file, in some examples, includes more than one pre-generated digital signature. For example, the command file can include multiple pre-generated digital signatures for multiple memory systems at the same host device or at different host devices.

In some examples, the command file includes one or more sequences of pre-generated digital signatures for a particular memory system. The sequence of pre-generated digital signatures corresponds to a sequence of commands to be executed at the memory system. Successive pre-generated digital signatures can correspond to successive commands in the sequence of commands. Also, successive pre-generated digital signatures can correspond to increasing memory system counter values. In this way, the programming appliance can send command messages using the successive pre-generated digital signatures to execute the sequence of commands at the memory device.

In some examples, the command file includes multiple pre-generated signatures for the same memory system and signed command, but associated with different memory system counter values. The programming appliance can query the memory system to determine its current value and select the pre-generated digital signature associated with a memory system counter value that is equal to the current memory system counter value.

In some examples, the programming appliance is configured to increment the memory system counter until its current value is equal to the memory system counter value associated with a pre-generated digital signature. The programming appliance queries the memory system to receive the current value of the memory system counter. The programming appliance then increments the memory system counter until its value matches the memory system counter value associated with the pre-selected digital signature.

FIG. 1 illustrates an example of an environment 100 including a host device 105, memory systems 110A, 110B, 110N, and a programming appliance 120 that includes a command file 126. The host device 105 is in communication with one or more memory systems 110A, 110B, 110N via a communication interface 162. The host device 105 and/or the memory systems 110A, 110B, 110N may be included in a variety of products, such as Internet of Things (IoT) devices (e.g., a refrigerator or other appliance, sensor, motor or actuator, mobile communication device, automobile, drone, etc.), network appliances (e.g., routers, switches, etc.), or any other suitable products to support processing, communications, or control of the product. In some examples, the host device 105 and memory systems 110A, 110B, 110N are included in a common board or package.

In the example environment 100 of FIG. 1, the host device 105 includes a host controller 160. The host controller 160 can include a processor, an application specific integrated circuit (ASIC), field programmable gate array (FPGA) or other suitable component or components that may, among other functions, manage the memory devices 110A, 110B, 110N. One or more communication interfaces 162 can be used to transfer data between the memory systems 110A, 110B, 110N and one or more other components of the host device 105, such as the host controller 160. Examples of such communication interfaces include Serial Advanced Technology Attachment (SATA) interfaces, Peripheral Component Interconnect Express (PCIe) interfaces, Universal Serial Bus (USB) interfaces, Universal Flash Storage (UFS) interfaces, eMMC™ interfaces, or one or more other connectors or interfaces. The host device 105 can include a host system, an electronic device, a processor, a memory card reader, or one or more other electronic devices external to the memory systems 110A, 110B, 110N. Although three memory systems 110A, 110B, 110N are shown as part of the host system 105, in other examples, more or fewer memory systems can be included. In some examples, the host device 105 may be a machine having some portion, or all, of the components discussed with reference to the machine 900 of FIG. 9. Also, additional examples of host devices 105 are discussed with reference to FIG. 8.

The example of FIG. 1 includes various additional features of the memory system 110A. The other memory systems 110B, 110N may include the same features, or different features. In FIG. 1, the memory system 110A includes a memory controller 115 and a memory array 121. The memory array 121 includes a number of individual memory die (e.g., a stack of two-dimensional or three-dimensional (3D) NAND die, a stack of NOR die, etc.). In an example, the memory systems 110A, 110B, 110N can be discrete memory or storage device components of the host device 105. In other examples, the memory systems 110A, 110B, 110N can be a portion of an integrated circuit (e.g., system on a chip (SOC), etc.), stacked or otherwise included with one or more other components of the host device 105.

The memory controller 115 can receive instructions from the host device 105, and can communicate with the memory array 121, such as to transfer data to (e.g., write or erase) or from (e.g., read) one or more of the memory cells, planes, sub-blocks, blocks, or pages of the memory array 121. The memory controller 115 can include, among other things, circuitry or firmware, including one or more components or integrated circuits. For example, the memory controller 115 can include one or more memory control units, circuits, or components configured to control access across the memory array 121 and to provide a translation layer between the host device 105 and the memory system 110A. The memory controller 115 can include one or more input/output (I/O) circuits, lines, or interfaces to transfer data to or from the memory array 121.

The memory controller 115 can include, among other things, circuitry or firmware, such as a number of components or integrated circuits associated with various memory management functions. Management functions for NAND storage units can include wear leveling (e.g., garbage collection or reclamation), error detection or correction, block retirement, or one or more other memory management functions.

The memory controller 115 may parse or format commands received from the host 105 into host commands (e.g., commands received from a host) into device commands (e.g., commands associated with operation of a memory array, etc.), or generate device commands (e.g., to accomplish various memory management functions) for the memory controller 115 or one or more other components of the memory system 110A.

For example, when the host controller 160 receives a command message from the programming appliance 120, as described herein, the host controller 160 sends the command message to the memory controller 115 of the appropriate memory system 110A. The memory controller 115 can verify a digital signature included with the command message and, if the digital signature is verified, execute the command. For unsigned commands, the memory controller 115 can execute the command without first verifying a digital signature.

The memory controller 115 can manage a set of management tables configured to maintain various information associated with one or more components of the memory system 110A (e.g., various information associated with a memory array or one or more memory cells coupled to the memory controller 115). For example, for a NAND memory system, the management tables can include information regarding block age, block erase count, error history, or one or more error counts (e.g., a write operation error count, a read bit error count, a read operation error count, an erase error count, etc.) for one or more blocks of memory cells coupled to the memory controller 115. In certain examples, if the number of detected errors for one or more of the error counts is above a threshold, the bit error can be referred to as an uncorrectable bit error. The memory controller 115 can maintain at the management tables a count of correctable or uncorrectable bit errors, among other things.

Management tables can also include one or more logical-to-physical (L2P) tables including L2P pointers relating logical addresses to physical addresses at the memory array 121. The management tables may be stored at a RAM of the memory controller 115. In some examples, some or all of the management tables are stored at the memory array 121. For example, the memory controller 115 may read the management tables from the memory array 121 and/or cache some or all of the management tables at RAM of the memory controller 115.

The memory controller 115 can also include, among other things, circuitry or components configured to control memory operations associated with writing data to, reading data from, or erasing one or more memory cells of the memory system 110A coupled to the memory controller 115. The memory operations can be based on, for example, host commands received from the host device 105 (e.g., the host controller 160 thereof), or internally generated by the memory controller 115 (e.g., in association with wear leveling, error detection or correction, etc.).

The memory controller 115 can include an error correction code (ECC) component 140, which can include, among other things, an ECC engine or other circuitry configured to detect or correct errors associated with writing data to or reading data from one or more memory cells of the memory system 110A coupled to the memory controller 115. The memory controller 115 can be configured to actively detect and recover from error occurrences (e.g., bit errors, operation errors, etc.) associated with various operations or storage of data, while maintaining integrity of the data transferred between the host device 105 and the memory system 110A, or maintaining integrity of stored data (e.g., using redundant RAID storage, etc.), and can remove (e.g., retire) failing memory resources (e.g., memory cells, memory arrays, pages, blocks, etc.) to prevent future errors.

In the example environment 100 of FIG. 1, the memory controller 115 also includes a cryptographic engine 142. The cryptographic engine 142 can be configured to execute cryptographic operations on data, for example, as described herein. The cryptographic engine 142 may include one or more key registers and one or more math engines. Key registers can store cryptographic keys used to execute cryptographic operations. For example, a key register can store the memory system cryptographic key for evaluating signed commands (e.g., a public key of the signing device and/or a symmetric key also known to the signing device). Although key registers are described as components of the cryptographic engine 142, in some examples, key registers may be positioned elsewhere, for example, a secured location at the memory array 121. The math engine can be configured to perform cryptographic operations, for example, utilizing one or more cryptographic keys stored at a key register.

The cryptographic engine 142 can be configured to execute one or more cryptographic operations to generate digital signatures as described herein. The cryptographic engine 142 can be configured to generate digital signatures using any suitable cryptographic algorithm such as, for example, a cryptographic hash function such as an SHA algorithm (e.g., SHA256), the MD5 algorithm, etc. A cryptographic has function maps an input value to a, usually shorted, hash value. The hash function can be selected such that it is unlikely that two different input values will map to the same hash value. The cryptographic engine 142 can be configured to generate a digital signature by executing a hash function on an input value related to the thing being digitally signed. For example, the cryptographic engine 142 can concatenate a signed command to be executed, a memory system counter value, and a cryptographic key to form an input value. The cryptographic engine 142 can then execute the has function on the input value to generate a digital signature.

In some examples, the cryptographic engine 142 is configured to operate in conjunction with a communication interface between the host device 105 and the memory system 110A. For example, the cryptographic engine 142 may comprise a key register or other suitable storage location for storying a cryptographic key that is used for encrypting and/or generating digital signatures related to communications between the memory system 110A and host device 105, for example, according to the PCIe or other suitable interface.

In some examples, the memory controller 115 also comprises a memory device counter 146. The memory device counter 146 includes software or hardware for incrementing counter values. The memory device counter 146 can be a monotonic counter that is configured such that the counter values always move in a particular direction along a counter sequence. For example, the memory device counter 146 begins at a known initial value (e.g., when the memory system 110A is manufactured). When an incrementing event occurs, the monotonic counter 146 increments from the known initial value to a next value along the counter sequence in the counter sequence direction. When a subsequent incrementing event occurs, the monotonic counter 146 increments to the next value along the counter sequence, and so on. The counter sequence can include, for example, a set of rising integers, a set of declining integers, a set of prime integers, a set of even integers, or any other suitable sequence. As used herein, a first counter value is said to be larger than a second counter value if the first counter value is encountered along the counter sequence after incrementing the counter one or more times from the second counter value along the counter sequence direction.

Incrementing events can include any suitable event at the memory system 110A. For example, an incrementing event can occur when the memory system 110A executes a command. Another example incrementing event can occur when the memory system 110A receives an instruction to increment the monotonic counter 146. Another example incrementing event can occur when the memory system 110A is reset or restarted.

The memory array 121 can include several memory cells arranged in, for example, one or more devices, one or more planes, one or more sub-blocks, one or more blocks, one or more pages, etc. As one example, a 48 GB TLC NAND memory device can include 18,592 bytes (B) of data per page (16,384+2208 bytes), 1536 pages per block, 548 blocks per plane, and 4 or more planes per device. As another example, a 32 GB MLC memory device (storing two bits of data per cell (i.e., 4 programmable states)) can include 18,592 bytes (B) of data per page (16,384+2208 bytes), 1024 pages per block, 548 blocks per plane, and 4 planes per device, but with half the required write time and twice the program/erase (P/E) cycles as a corresponding TLC memory device. Other examples can include other numbers or arrangements. In some examples, a memory device, or a portion thereof, may be selectively operated in SLC mode, or in a desired MLC mode (such as TLC, QLC, etc.).

The memory array 121 includes physical address locations 150A, 150B, 150N. A physical address location 150A, 150B, 150N is a location at the memory array 121 that is uniquely associated with a physical address. In operation, data is typically written to or read from a NAND memory array 121 in pages, and erased in blocks. For example, a physical address location 150A, 150B, 150N may correspond to a page. However, some memory operations (e.g., read, write, erase, etc.) can be performed on larger or smaller groups of memory cells, as desired. Accordingly, in some examples (e.g., for some operations) a physical address location 150A, 150B, 150N includes more or less than one page. The data transfer size of the memory system 110A is typically referred to as a page, whereas the data transfer size of a host device 105 is typically referred to as a sector.

Although a page of data can include a number of bytes of user data (e.g., a data payload including a number of sectors of data) and its corresponding metadata, the size of the page often refers only to the number of bytes used to store the user data. As an example, a page of data having a page size of 4 KB may include 4 KB of user data (e.g., 8 sectors assuming a sector size of 512 B) as well as a number of bytes (e.g., 32 B, 54 B, 224 B, etc.) of metadata corresponding to the user data, such as integrity data (e.g., error detecting or correcting code data), address data (e.g., logical address data, etc.), or other metadata associated with the user data. Physical address locations 150A, 150B, 150N with storage for metadata, etc. may be referred to as over-provisioned physical address locations.

Different types of memory cells or memory arrays 120 can provide for different page sizes, or may require different amounts of metadata associated therewith. For example, different memory device types may have different bit error rates, which can lead to different amounts of metadata necessary to ensure integrity of the page of data (e.g., a memory device with a higher bit error rate may require more bytes of error correction code data than a memory device with a lower bit error rate). As an example, a multilevel cell (MLC) NAND flash device may have a higher bit error rate than a corresponding single-level cell (SLC) NAND flash device. As such, the MLC device may require more metadata bytes for error data than the corresponding SLC device.

FIG. 1 also shows the programming appliance 120 in communication with the host device 105. The programming appliance 120 can be or include any suitable computing device or component such as, for example, one or more servers, one or more processors, one or more ASICs, one or more FPGAs, etc. The programming appliance 120 includes a programming appliance data storage 122 that can include any suitable volatile or nonvolatile data storage. The data storage 122 stores a command file 126. The command file 126 includes one or more pre-generated digital signatures, as described herein.

The command file 126 is created by a generator device 124. The generator device 124 can include any suitable computing device or component such as, for example, one or more servers, one or more HSMs, etc. The generator device 124 has access to the cryptographic keys for the memory systems 110A, 110B, 110N and creates the pre-generated digital signature or signatures included with the command file 126. For example, in symmetric arrangements, the generator device 124 has access to symmetric cryptographic keys shared with the respective memory systems 110A, 110B, 110N. In asymmetric arrangements, the generator device 124 has access to private keys corresponding to public keys stored at the respective memory devices 110A, 110B, 110N.

The generator device 124 provides the command file 126 to the programming appliance 120 in any suitable manner for example, by a wired or wireless network connection, by a physical medium that is mailed or otherwise physically transported to the location of the programming appliance 120, etc.

The programming appliance 120 uses the command file 126 to program one or more of the memory systems 110A, 110B, 110N, as described herein. For example, the programming appliance 120 selects from the command file 126 a pre-generated digital signature associated with a memory system 110A, 110B, 110N, a signed command and a selected value of the memory device counter 146. The selected value of the memory device counter 146 may be the known initial value of the counter 146 or another value. The programming appliance 120 generates a command message 128 including the pre-generated digital signature and the command that is associated with the pre-generated digital signature.

The command message 128 is provided to the host controller 160 that, in turn, provides the command message to the memory system 110A. The memory system 110A (e.g., the controller 115 thereof) generates a cryptographic digest using the command from the command message 128, a current value of the memory device counter 146, and the memory system's cryptographic key. For example, the cryptographic digest can be generated using the cryptographic engine 142 to execute a cryptographic operation on the command, memory device counter value, and the cryptographic key for the memory system 110A. If the check digital signature is equivalent to the pre-generated digital signature, then the memory system 110A executes the indicated command.

Figure 2:
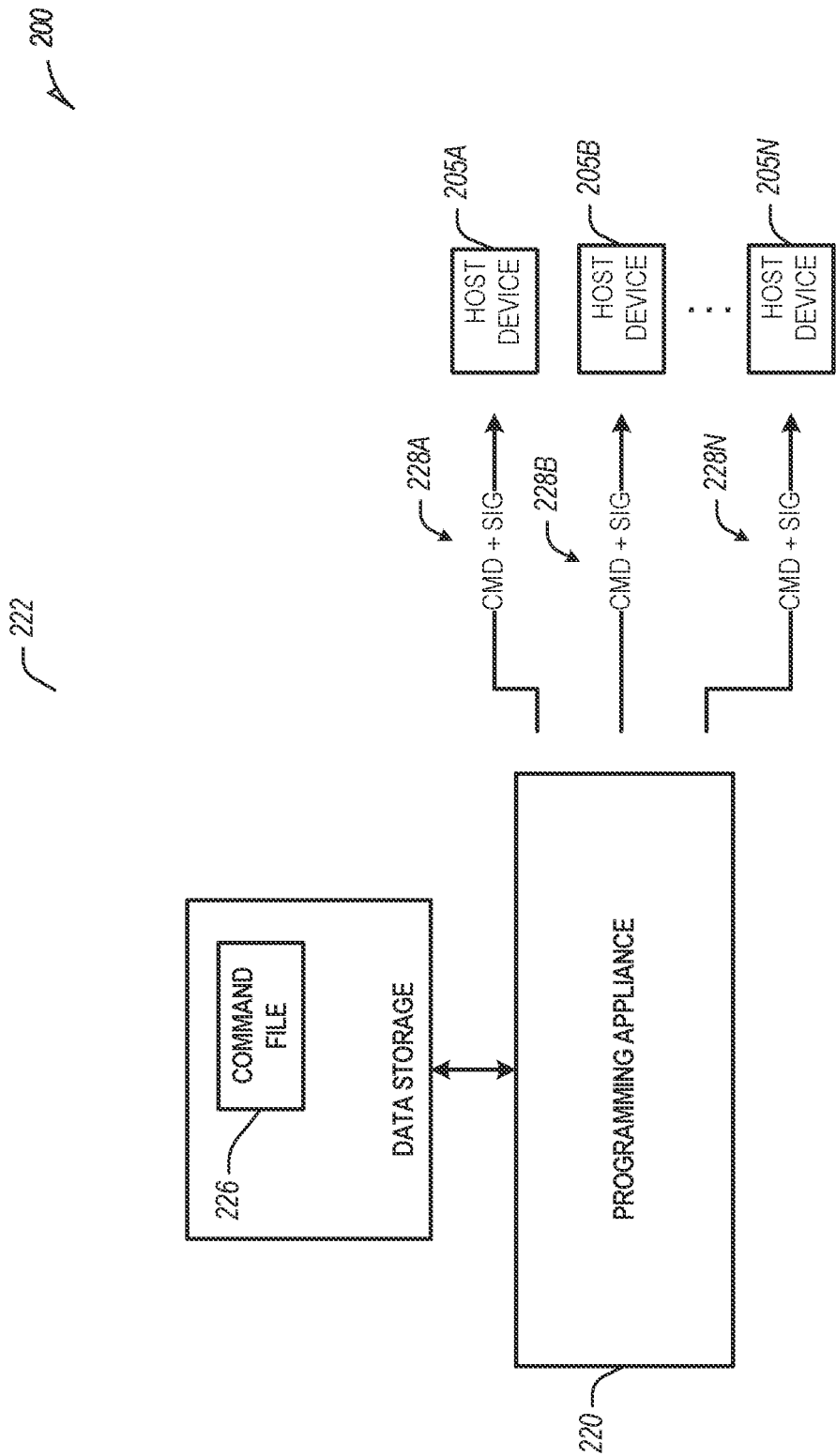
FIG. 2 illustrates another example environment including a programming appliance configured to program memory systems at a number of host devices.

FIG. 2 illustrates another example environment 200 including a programming appliance 220 configured to program memory systems through a number of host devices 205A, 205B, 205N. Each host device 205A, 205B, 205N can be in communication with one or more memory systems, similar to the memory systems 110A, 110B, 110N of the host device 105 of FIG. 1. Three host devices 205A, 205B, 205N are shown in FIG. 2, however, a single programming appliance may program memory systems at more or fewer host devices 205A, 205B, 205N than are shown. The programming appliance 220 sends command messages 228A, 228B, 228N to the respective host devices 205A, 205B, 205N. The command messages 228A, 228B 228N include commands and pre-generated signatures from a command file 226 stored at the data storage 222 of the programming appliance 220. Each of the command messages 228A, 228B, 228N can be directed to a host devices 205A, 205B, 205N, which directs the command message 228A, 228B, 228N to a particular memory system.

In some examples, a command file, such as the command files 126, 226, include multiple pre-generated digital signatures that can be referenced by memory system, signed command, and/or memory system counter values. TABLE 1 below shows one arrangement of an example command file including pre-generated digital signatures for various memory systems described by unique identifiers (UIDs): UID0, UID1, UIDN:

TABLE 1

| SIGNED COMMAND | MS COUNTER VALUE | PRE-GENERATED SIG. |
| --- | --- | --- |
| UID0 | | |
| CMD0 | MTC0 | — |
| CMD0 | MTC1 | — |
| CMD0 | MTC2 | — |
| ... | | |
| CMD0 | MTCN | — |

TABLE 1-continued

| SIGNED COMMAND | MS COUNTER VALUE | PRE-GENERATED SIG. |
| --- | --- | --- |
| UID1 | | |
| CMD0 | MTC0 | — |
| CMD0 | MTC1 | — |
| CMD0 | MTC2 | — |
| ... | | |
| CMD0 | MTCN | — |
| ... | | |
| UIDN | | |
| CMD0 | MTC0 | — |
| CMD0 | MTC1 | — |
| CMD0 | MTC2 | — |
| ... | | |

In TABLE 1, the pre-generated digital signatures are not provided but, instead, are represented by "- - -." In this example, the command file includes, for each memory system (UID0, UID1 . . . , UIDN), digital signatures generated for a first signed command (CMD0) for a number of different memory device counter values (MTC0-MTCN). In use, the programming appliance queries the appropriate host device to provide current memory system counter values for one or more memory systems in communication with the host device. For each memory system (UID0, UID1 . . . , UIDN), the programming appliance selects the pre-generated digital signature associated with that memory appliance, the first signed command (CMD0) and the current memory system counter value for that memory system. The programming appliance then generates command messages for the respective memory systems (UID0, UID1 . . . , UIDN) including the first command (CMD0) and the selected pre-generated digital signatures.

TABLE 2 shows another example arrangement of a command file, such as the command file 126, 226 including sequences of pre-generated digital signatures for the memory systems (UID0, UID1 . . . , UIDN):

TABLE 2

| SIGNED COMMAND | MS COUNTER VALUE | PRE-GENERATED SIG. |
| --- | --- | --- |
| UID0 | | |
| CMD0 | MTC0 | — |
| CMD1 | MTC1 | — |
| ... | | |
| CMDN | MTCN | — |
| UID1 | | |
| CMD0 | MTC0 | — |
| CMD1 | MTC1 | — |
| ... | | |
| CMDN | MTCN | — |
| ... | | |
| UIDN | | |
| CMD0 | MTC0 | — |
| CMD1 | MTC1 | — |
| ... | | |
| CMDN | MTCN | — |

The sequence of pre-generated digital signatures for each memory system corresponds to a sequence of signed commands (CMD0, CMD1 . . . , CMDN). For example, a sequence of pre-generated digital signatures for a first memory system (UID0) includes a first pre-generated digital signature associated with a first command (CMD0) and a first memory system counter value (MTC0); a second pre-generated digital signature associated with a second command (CMD1) and a second memory system counter value (MTC1) greater than the first memory system counter value; and so on. The programming device can (via the appropriate host device) execute the sequence of signed commands at a memory system (UID0) by sending a command message including the pre-generated digital signature associated with (UID0, CMD0, MTC0) to the memory system (UID0). Executing the first command (UID0) at the memory system may cause the memory system counter to increment from the memory system counter value (MTC0) to the memory system counter value (MTC1). The programming appliance then sends a second command message to the memory system (UID0) including the pre-generated digital signature associated with (UID0, CMD1, MTC1), and so on.

In some examples, a command file can include pre-generated digital signatures to support more than one command sequence per memory system. For example, TABLE 2 shows sequences of pre-generated digital signatures beginning at memory system counter value (MTC0) to execute the command sequence (CMD0, CMD1 . . . , CMDN). An example command file can also include additional sequences of pre-generated digital signatures for one or more of the memory systems to execute additional command sequences. Additional sequences of pre-generated digital signatures can begin at the same memory system counter value (e.g., MTC0 in the example of TABLE 2) or at different memory system counter values.

In some examples, sequences of pre-generated digital signatures for different command sequences can share common pre-generated digital signatures. Referring to the example of TABLE 2, consider an example command sequence (CMDX, CMD1 . . . , CMDZ) beginning at memory system counter value (MTC0). Both this command sequence and the command sequence shown in TABLE 2 include a pre-generated digital signature for the signed command (CMD1) at memory system counter value MTC1. In some examples, the command file includes one copy of pre-generated signatures, such as this, that can be part of multiple command sequences. The single copy of the pre-generated digital signature can be referenced to multiple command sequences. For example, the command file can include command sequence data describing command sequences supported by the command file and referencing sequences of pre-generated digital signatures for the respective command sequences.

TABLE 3 shows yet another example arrangement of a command file, such as the command file 126, 226, including sequences of pre-generated signatures starting at different memory system counter values. The sequences of pre-generated digital signatures in TABLE 3 corresponds to a sequence of signed commands (CMD0, CMD1 . . . , CMDN). In the example of TABLE 3, the command file includes multiple sequences of pre-generated digital signatures for each memory system and command sequence. For example, as shown below, different sequences of pre-generated digital signatures for a memory system and command sequence can begin at different memory system counter values. The programming appliance can query the memory system for its current memory system counter value and select a sequence of pre-generated digital signatures that begin at the current memory system counter value.

TABLE 3

| SIGNED COMMAND | MS COUNTER VALUE | PRE-GENERATED SIG. |
|---|---|---|
| UID0 | | |
| CMD0 | MTC0 | — |
| CMD1 | MTC1 | — |
| . . . | | |
| CMDN | MTCN | — |
| CMD0 | MTC1 | — |
| CMD1 | MTC2 | — |
| . . . | | |
| CMDN | MTCN + 1 | — |
| UID1 | | |
| . . . | | |
| UIDN | | |

Figure 3:
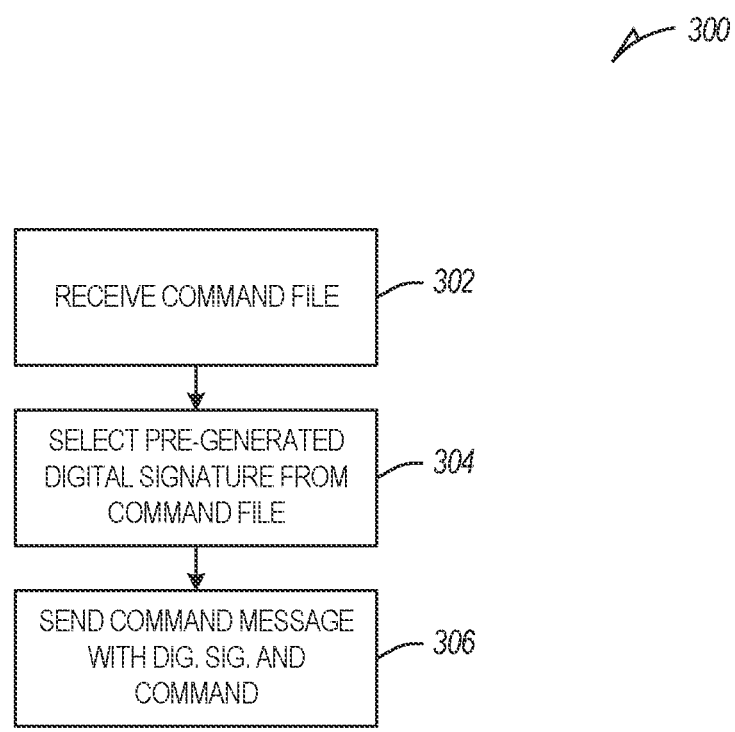
FIG. 3 is a flowchart showing one example of a process flow that can be executed by a programming appliance to send a command to a memory system.

FIG. 3 is a flowchart showing one example of a process flow 300 that can be executed by a programming appliance to send a command to a memory system. At operation 302, the programming appliance receives a command file including at least one pre-generated digital signature. The command file can be received from a generator device, such as an HSM. The command file can be received in any suitable manner. For example, the command file can be received via an electronic medium such as e-mail. The command file, in some examples, can also be received in physical form such as, for example, on a storage device that is mailed or shipped to a location of the programming appliance.

At operation 304, the programming appliance selects a pre-generated digital signature from the command file. The selected pre-generated digital signature corresponds to a memory system (e.g., at a host), a signed command, and a memory system counter value. The programming appliance may select the pre-generated digital signature based on a signed command to be sent, the memory system to which the pre-generated digital signature will be sent, and an expected value of the memory system counter. The expected value of the memory system counter is the value that the programming appliance expects the memory system counter to have. For example, if the memory system is newly manufactured, the expected value of the memory system counter can be the known initial value or a predetermined memory system counter value greater than the known initial value. (E.g., the memory system may be known to experience a known number of incrementing events during manufacture.) Also, in some examples, the programming appliance queries the memory system to receive the current memory system counter value and selects the pre-generated digital signature based on the memory system's reply.

At operation 306, the programming appliance sends to the memory system a command message. The command message includes the selected pre-generated digital signature and a signed command associated with the pre-generated digital signature. Sending the command message to the memory system can include sending the command message to a host device including the memory system. A host controller may forward the command message to the memory system.

Figure 4:
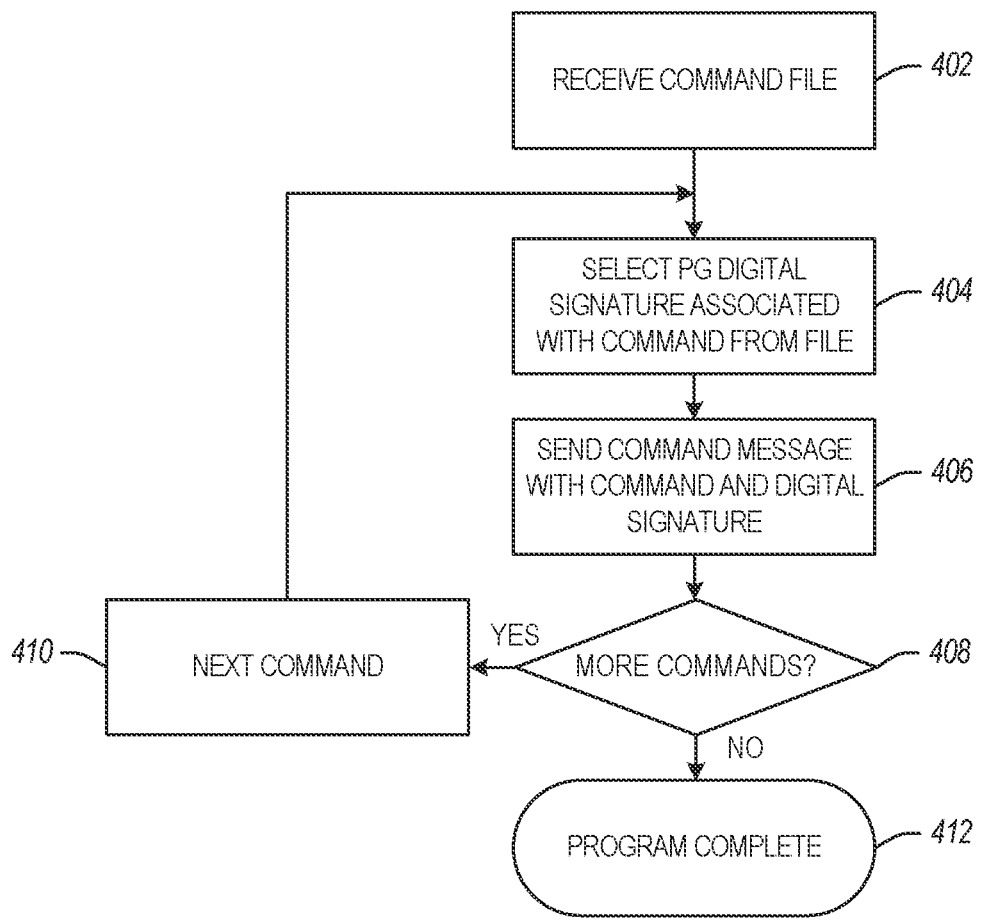
FIG. 4 is a flowchart showing one example of a process flow that can be executed by a programming appliance to send a command sequence to a memory system.

FIG. 4 is a flowchart showing one example of a process flow 400 that can be executed by a programming appliance to send a command sequence to a memory system. At operation 402, the programming appliance receives a command file including at least one pre-generated digital signature. At operation 404, the programming appliance selects a pre-generated digital signature from the command file. For a first memory system, the first selected pre-generated digital signature corresponds to a first command of the command sequence, the first memory system, and a first memory system counter value. At operation 406, the programming appliance sends a command message including the pre-generated digital signature selected at operation 404 and the signed command associated with pre-generated digital signature.

At operation 408, the programming appliance determines, at operation 408, whether there are more commands in the command sequence. For example, the programming appliance can consult command sequence data, which may be included in the command file. The command sequence data indicates the commands in the command sequence and/or pre-generated digital signatures in a sequence of pre-generated digital signatures that correspond to the command sequence. If all of the commands of the command sequence have been sent to the memory system, then the program is complete at operation 412. If there are additional commands in the command sequence, the programming appliance moves to the next command at operation 410, and then returns to operation 404 to select the pre-generated digital signature associated with the next command.

Figure 5:
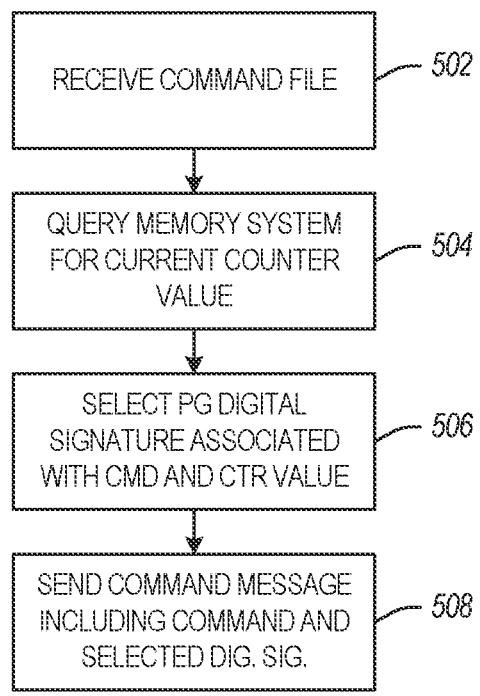
FIG. 5 is a flowchart showing one example of a process flow that can be executed by a programming appliance to send a command to a memory system.

FIG. 5 is a flowchart showing one example of a process flow 500 that can be executed by a programming appliance to send a command to a memory system. At operation 502, the programming appliance receives a command file including at least one pre-generated digital signature. At operation 504, the programming appliance queries a memory system for its current memory system counter value. The query may be sent directly to the memory system or to a host device or host controller in communication with the memory system. The memory system responds by providing its current memory system counter value.

At operation 506, the programming appliance selects from the command file a pre-generated digital signature associated with a signed command and the current memory system counter value. At operation 508, the programming appliance sends to the memory system a command message including the selected pre-generated digital signature and the signed command.

Figure 6:
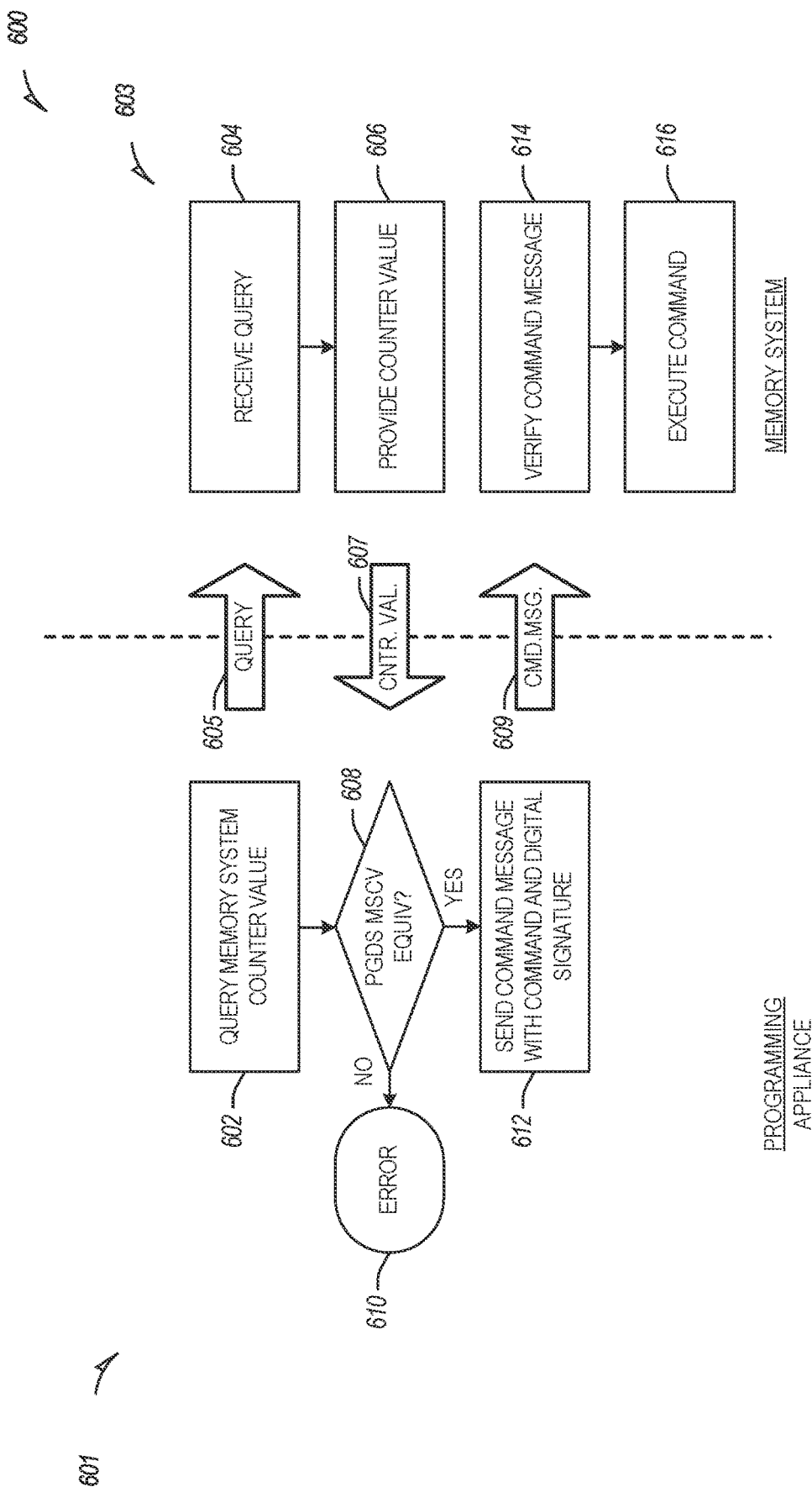
FIG. 6 is a flowchart showing one example of a process flow for sending a command message with a pre-generated digital signature to a memory system.

FIG. 6 is a flowchart showing one example of a process flow 600 for sending a command message with a pre-generated digital signature to a memory system. The process flow 600 includes two columns 601, 603. The column 601 includes operations that can be executed by a programming appliance. The column 603 includes features that can be executed by a memory system. The programming appliance can possess the pre-generated digital signature at the beginning of the process flow 600. Communications between the memory system and the programming appliance, in some examples, are facilitated by a host device in communication with the memory system.

At operation 602, the programming appliance queries the memory system for its current memory system counter value, for example, by sending a query 605. The memory system receives the query 605 at operation 604. At operation 606, the memory device provides a counter value message 607 including the current memory system counter value.

The programming appliance receives the counter value message 607 and determines, at operation 608, if the current memory system counter value is equivalent to the memory system counter value that is associated with the pre-generated digital signature. If the current memory system counter value does not match the memory system counter value that is associated with the pre-generated digital signature, the programming appliance enters error processing at operation 610. Accordingly, the process flow enters error processing at operation 612. Error processing can include, for example, ending the process flow 600 and/or selecting a different pre-generated digital signature associated with a memory system counter value that matches the current memory system counter value.

If the current memory system counter value matches the memory system counter value that is associated with the pre-generated digital signature, the programming appliance sends a command message 609 to the memory system at operation 612. The command message 609 includes the signed command associated with the pre-generated digital signature and the pre-generated digital signature.

The memory system verifies the command message 609 at operation 614. Verifying the command message can include generating a check digital signature from the command, the current value of the memory system counter, and the cryptographic key. If the check digital signature matches the pre-generated digital signature, the memory system executes the command at operation 616.

Figure 7:
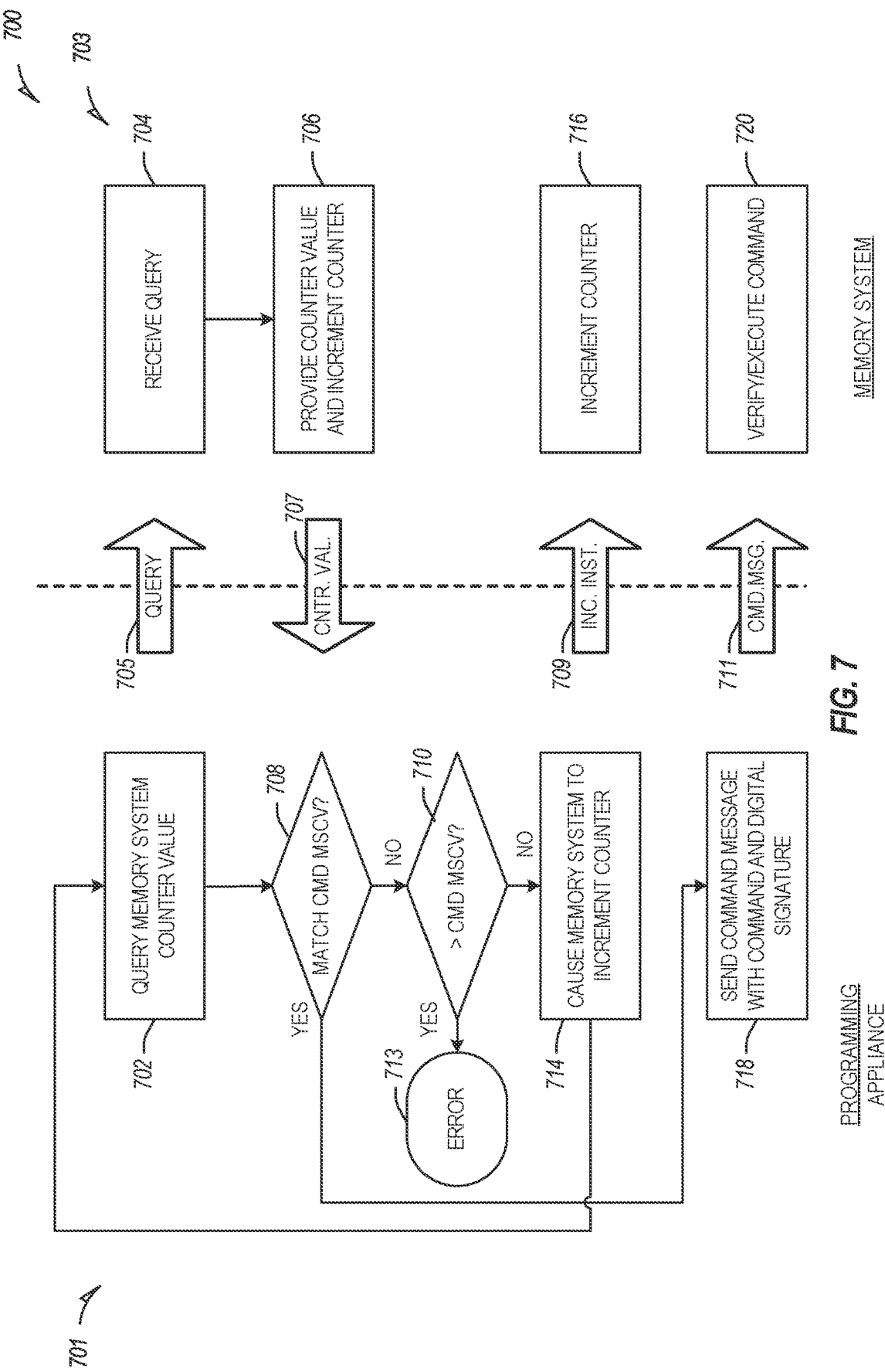
FIG. 7 is a flowchart showing one example of a process flow for sending a command message with a pre-generated digital signature to a memory system.

FIG. 7 is a flowchart showing one example of a process flow 700 for sending a command message with a pre-generated digital signature to a memory system. The process flow 700 includes two columns 701, 703. The column 701 includes operations that can be executed by a programming appliance. The column 703 includes features that can be executed by a memory system. Communications between the memory system and the programming appliance, in some examples, are facilitated by a host device in communication with the memory system.

In the process flow 700, the programming appliance increments the memory system counter until the memory system counter value matches the memory system counter value associated with a pre-generated signature. The pre-generated signature can be associated with a single command. In some examples, the pre-generated signature can be associated with a sequence of commands (e.g., it may be the first pre-generated signature of the sequence). Incrementing the memory system counter, as described with respect to the process flow 700, may allow the programming appliance to use command files with fewer pre-generated signatures. For example, the programming appliance may not need to use a command file, such as the examples of TABLES 1 and 3 above, that include more than one pre-generated digital signature for a given combination of a memory device and a signed command.

At the outset of the process flow 700, the programming appliance possesses a pre-generated digital signature. The pre-generated digital signature can be associated with a stand-alone signed command or, in some examples, is associated with a first command of a command sequence. At operation 702, the programming appliance queries the memory system for its current memory system counter value, for example, by sending a query 705. The query 705 can be directed to a host device or host controller thereof that is associated with the memory device. The memory system receives the query 705 at operation 704. At operation 706, the memory device provides a counter value message 707 including the current memory system counter value.

At operation 708, the programming appliance determines if the current memory system counter value matches the memory system counter value associated with the pre-generated digital signature. If there is no match, the programming appliance determines, at operation 710, whether the current value of the memory system counter is greater than the memory system counter value associated with the pre-generated digital signature.

If the current memory system counter value is higher than the pre-generated digital signature (e.g., farther along the counter sequence), it indicates that the pre-generated digital signature may not be suitable for use. For example, because the memory system counter is monotonic, if it has already incremented past the memory counter value associated with the pre-generated digital signature, it may not be possible to use the pre-generated digital signature. The programming appliance enters error processing at operation 713. Error processing can include ending the process flow 700. In some examples, error processing includes selecting a different pre-generated digital signature from the command file and beginning the process flow 700 again.

Consider an example using the command file arrangement of TABLE 1 above where the pre-generated digital signature used with the process flow 700 was associated with the memory device (UID0), the signed command (CMD0), and the memory system counter value (MTC0). If the current memory system counter value is greater than the memory system counter value (MTC0), the programming appliance can select a different pre-generated digital signature from the command file associated with a higher memory system counter value. For example, the programming appliance can select a different pre-generated digital signature associated with a memory system counter value that is greater than or equal to the current memory system counter value provided by the memory device at operation 706.

Consider another example using the command file arrangement of TABLE 3 above where the pre-generated digital signature used with the process flow 700 is the first pre-generated digital signature corresponds to the memory system counter value (MTC0) and is the first pre-generated digital signature of a sequence of pre-generated digital signatures corresponding to the command sequence (CMD0, CMD1 ..., CMDN). If the current memory system counter value is greater than the memory system counter value (MTC0), the programming appliance can select a different sequence of pre-generated digital signatures that correspond to the command sequence (CMD0, CMD1 ..., CMDN). For example, the programming appliance can re-execute the process flow 700 using the first pre-generated digital signature from another sequence of pre-generated digital signatures that also corresponds to the command sequence (CMD0, CMD1 ..., CMDN).

Referring now back to operation 710, if the current value of the memory system counter is not greater than the memory system counter associated with the pre-generated digital signature, then the programming appliance causes the memory system to increment the memory system counter at operation 714. The programming appliance can send an incrementing instruction 709. The incrementing instruction 709 can be any action that prompts an incrementing event at the memory system. For example, the incrementing instruction 709 can be an explicit instruction to the memory system to increment its memory system counter. In another example, the incrementing instruction can be an instruction to the host device or host controller to reset the memory system. In response to the incrementing instruction 709, the memory system increments its memory system counter at operation 716.

After instructing the memory system to increment its memory system counter, the programming appliance returns to operation 702 and queries the memory system for its current counter value as described. In some examples, the programming appliance can predict the new current value of the memory system counter after incrementing from the previously-provided current value and the counter sequence. If the programming appliance predicts the new current value of the memory system counter, it may skip operation 702 and proceed to operation 708 instead (e.g., without re-querying the memory system for its current counter value).

The process flow 700 can execute until the current value of the memory system counter matches the selected value of the memory system counter associated with the pre-generated digital signature at operation 708. When that occurs, the programming appliance sends a command message 711 to the memory system at operation 718. The command message 711 includes the signed command associated with the pre-generated digital signature and the pre-generated digital signature.

The memory system verifies the command message 711 at operation 720. Verifying the command message can include generating a check digital signature from the command, the current value of the memory system counter, and the cryptographic key. If the check digital signature matches the pre-generated digital signature, the memory system executes the command.

In some example arrangements, the command file includes multiple pre-digital signatures for the same combination of memory system and signed command. TABLES 1 and 3 above describe example command files with this arrangement. As described herein, this can increase the flexibility of the programming appliance if the current memory system counter value can take a range of values. It may also create opportunities for an unauthorized actor who has obtained the command file to exploit the pre-generated digital signatures in it to cause unintended changes at the memory system.

Consider an example using the command file arrangement shown in TABLE 1 where the programming appliance causes the memory system (UID0) to execute the command (CMD0) using the pre-generated signature associated with memory device counter value (MTC0). The command file also includes pre-generated signatures for the signed command (CMD0) that correspond to other, greater memory system counter values (MTC1, MTC2 ..., MTCN). Accordingly, an unauthorized actor with possession of the command file could cause the memory system to execute the signed command (CMD0) again as long as the memory counter value at the memory system remains below (MTCN).

Consider another example using the command file configuration of TABLE 3 above where a programming appliance completes the command sequence (CMD0, CMD1, CMDN) at the memory device (CMD0) using the sequence of pre-generated digital signatures beginning at memory system counter value (MTC0). At the conclusion of the command sequence, it is possible that the current memory system counter value will still be below the memory system counter values associated with some of the pre-generated digital signatures. This means that an unauthorized actor with possession of the command file may be able to cause the memory system to execute additional signed commands. For example, after executing the command (CMDN) at memory system counter value (MTCN), an unauthorized actor may be able to cause the memory system to execute the signed command (CMDN) again using the pre-generated digital signature that corresponds to the memory counter value (MTCN+1).

Figure 8:
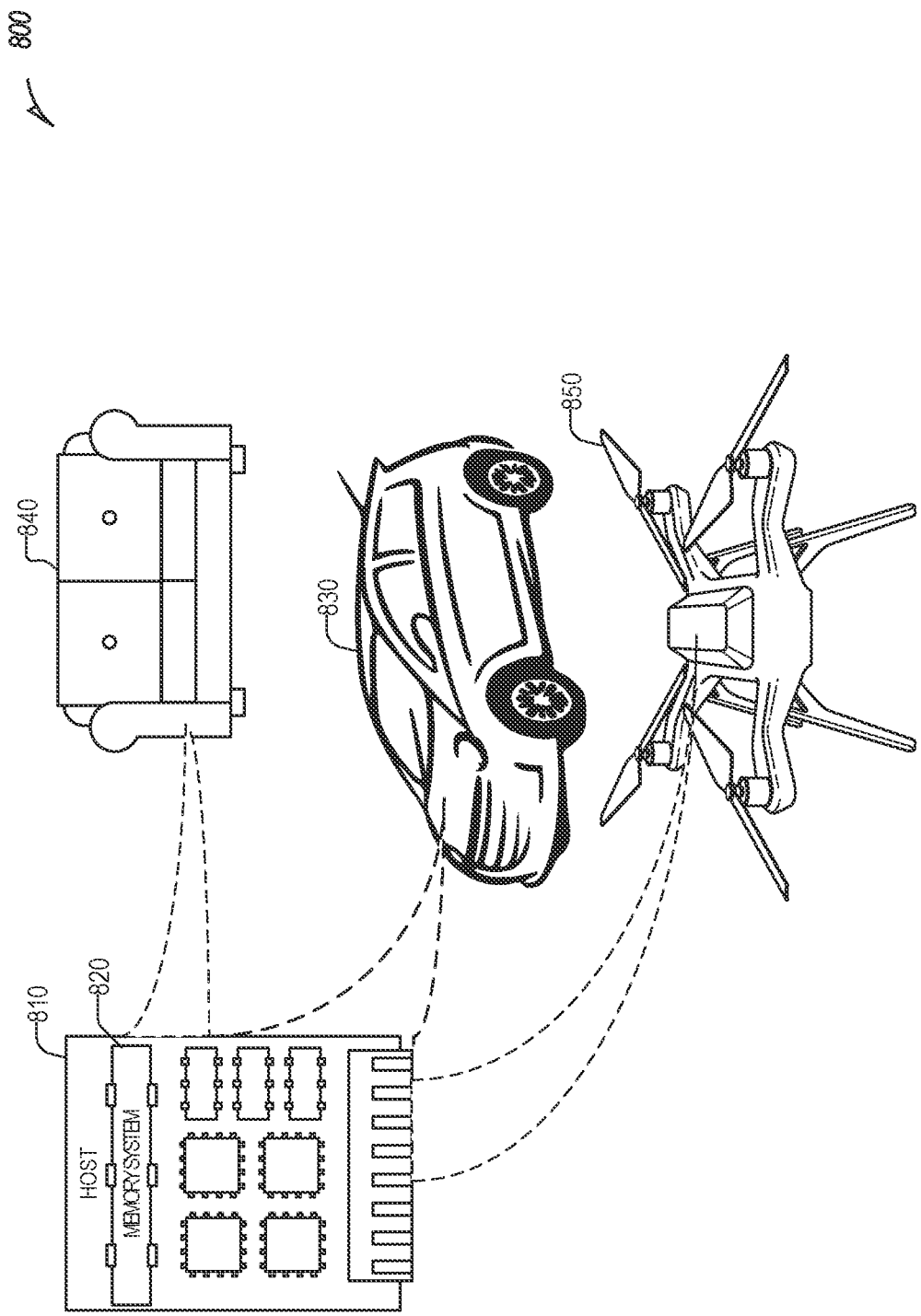
FIG. 8 shows an example host with a memory device as part of one or more apparatuses.

FIG. 8 shows an example host device 810 (e.g., host 105) with a memory system 820 (e.g., any of the memory devices described herein) as part of one or more apparatuses 830-9950. Apparatuses include any device that may include a host device, such as host device 810. The host device 810 may be any device capable of executing instructions (sequential or otherwise). Example apparatuses include a vehicle 830 (e.g., as part of an infotainment system, a control system, or the like), a drone 850 (e.g., as part of a control system), furniture or appliances 840 (e.g., as part of a sensor system, an entertainment or infotainment system), or the like. In other examples, although not shown, apparatuses may include aeronautical, marine, Internet of Things (IOT), and other devices.

Figure 9:
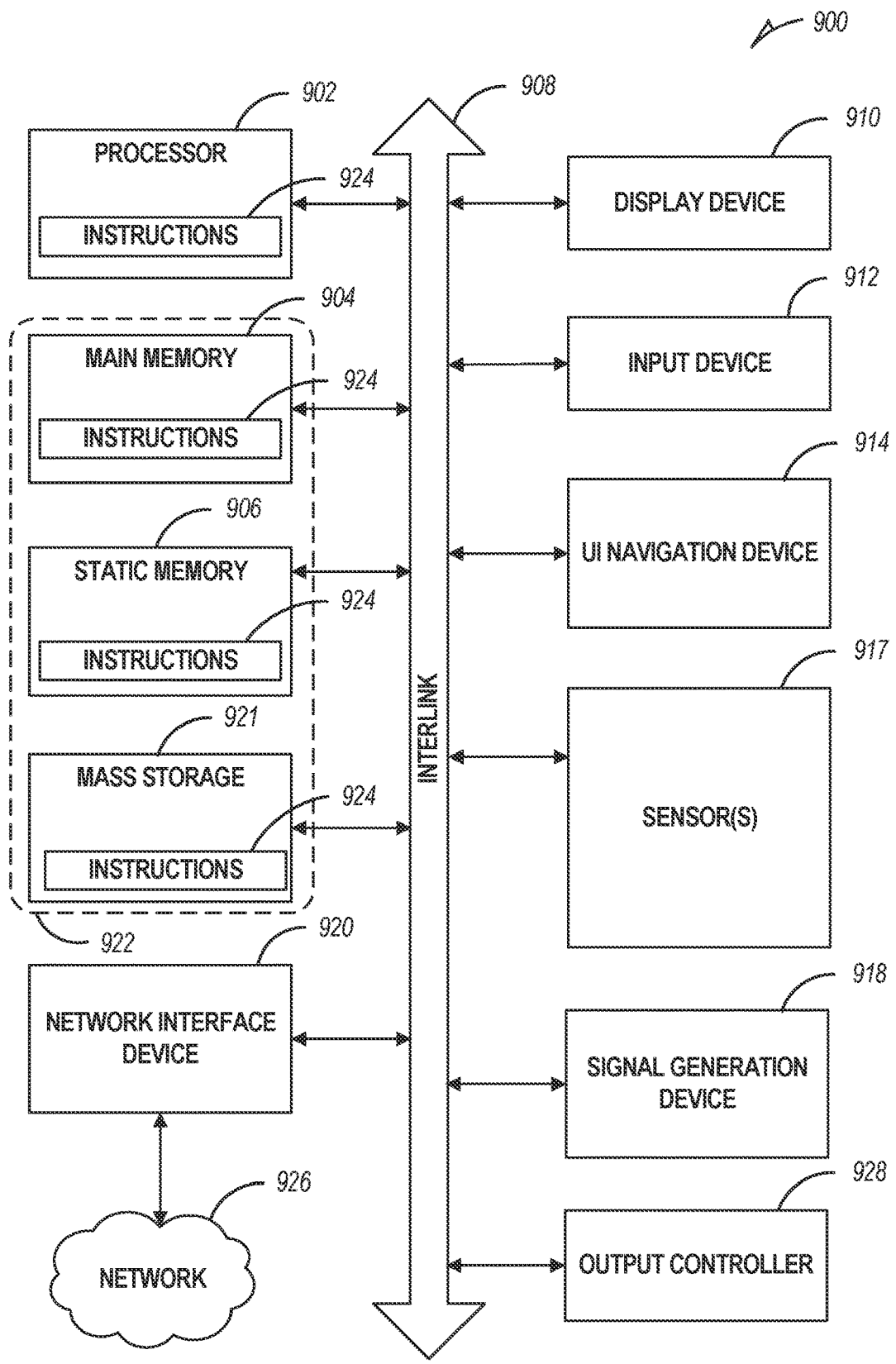
FIG. 9 is a block diagram illustrating an example of a machine upon which one or more embodiments may be implemented.

FIG. 9 illustrates a block diagram of an example machine 900 upon which any one or more of the techniques (e.g., methodologies) discussed herein may perform. In alternative embodiments, the machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in peer-to-peer (P2P) (or other distributed) network environment. The machine 900 may be a personal computer (PC), a tablet PC, a set-top box (STB), a personal digital assistant (PDA), a mobile telephone, a web appliance, an IoT device, automotive system, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic, components, devices, packages, or mechanisms. Circuitry is a collection (e.g., set) of circuits implemented in tangible entities that include hardware (e.g., simple circuits, gates, logic, etc.). Circuitry membership may be flexible overtime and underlying hardware variability. Circuitries include members that may, alone or in combination, perform specific tasks when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a non-transitory computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable participating hardware (e.g., the execution units or a loading mechanism) to create members of the circuitry in hardware via the variable connections to carry out portions of the specific tasks when in operation. Accordingly, the computer readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

The machine (e.g., computer system) 900 (e.g., the programming appliance 120, generator device 124, host device 105, the memory system 110A, etc.) may include a hardware processor 902 (e.g., a central processing unit (CPU), a graphics processing unit (GPU), a hardware processor core, or any combination thereof, such as the memory controller 115, etc.), a main memory 904 and a static memory 906, some or all of which may communicate with each other via an interlink (e.g., bus) 908. The machine 900 may further include a display unit 910, an alphanumeric input device 912 (e.g., a keyboard), and a user interface (UI) navigation device 914 (e.g., a mouse). In an example, the display unit 910, input device 912 and UI navigation device 914 may be a touch screen display. The machine 900 may additionally include a storage device (e.g., drive unit) 916, a signal generation device 918 (e.g., a speaker), a network interface device 920, and one or more sensors 917, such as a global positioning system (GPS) sensor, compass, accelerometer, or other sensor. The machine 900 may include an output controller 928, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 916 may include a machine readable medium 922 on which is stored one or more sets of data structures or instructions 924 (e.g., software) embodying or utilized by any one or more of the techniques or functions described herein. The instructions 924 may also reside, completely or at least partially, within the main memory 904, within static memory 906, or within the hardware processor 902 during execution thereof by the machine 900. In an example, one or any combination of the hardware processor 902, the main memory 904, the static memory 906, or the storage device 916 may constitute the machine readable medium 922.

While the machine readable medium 922 is illustrated as a single medium, the term "machine readable medium" may include a single medium or multiple media (e.g., a centralized or distributed database, or associated caches and servers) configured to store the one or more instructions 924.

The term "machine readable medium" may include any medium that is capable of storing, encoding, or carrying instructions for execution by the machine 900 and that cause the machine 900 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine-readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 924 (e.g., software, programs, an operating system (OS), etc.) or other data are stored on the storage device 921, can be accessed by the memory 904 for use by the processor 902. The memory 904 (e.g., DRAM) is typically fast, but volatile, and thus a different type of storage than the storage device 921 (e.g., an SSD), which is suitable for long-term storage, including while in an "off" condition. The instructions 924 or data in use by a user or the machine 900 are typically loaded in the memory 904 for use by the processor 902. When the memory 904 is full, virtual space from the storage device 921 can be allocated to supplement the memory 904; however, because the storage 921 device is typically slower than the memory 904, and write speeds are typically at least twice as slow as read speeds, use of virtual memory can greatly reduce user experience due to storage device latency (in contrast to the memory 904, e.g., DRAM). Further, use of the storage device 921 for virtual memory can greatly reduce the usable lifespan of the storage device 921.

In contrast to virtual memory, virtual memory compression (e.g., the Linux® kernel feature "ZRAM") uses part of the memory as compressed block storage to avoid paging to the storage device 921. Paging takes place in the compressed block until it is necessary to write such data to the storage device 921. Virtual memory compression increases the usable size of memory 904, while reducing wear on the storage device 921.

Storage devices optimized for mobile electronic devices, or mobile storage, traditionally include MMC solid-state storage devices (e.g., micro Secure Digital (microSD™) cards, etc.). MMC devices include a number of parallel interfaces (e.g., an 8-bit parallel interface) with a host device, and are often removable and separate components from the host device. In contrast, eMMC™ devices are attached to a circuit board and considered a component of the host device, with read speeds that rival serial ATA™ (Serial AT (Advanced Technology) Attachment, or SATA) based SSD devices. However, demand for mobile device performance continues to increase, such as to fully enable virtual or augmented-reality devices, utilize increasing networks speeds, etc. In response to this demand, storage devices have shifted from parallel to serial communication interfaces. Universal Flash Storage (UFS) devices, including controllers and firmware, communicate with a host device using a low-voltage differential signaling (LVDS) serial interface with dedicated read/write paths, further advancing greater read/write speeds.

The instructions 924 may further be transmitted or received over a communications network 926 using a transmission medium via the network interface device 920 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 920 may include one or more physical jacks (e.g., Ethernet, coaxial, or phone jacks) or one or more antennas to connect to the communications network 926. In an example, the network interface device 920 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 900, and includes digital or analog communications signals or other intangible medium to facilitate communication of such software.

The above detailed description includes references to the accompanying drawings, which form a part of the detailed description. The drawings show, by way of illustration, specific embodiments in which the invention can be practiced. These embodiments are also referred to herein as "examples". Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" may include "A but not B," "B but not A," and "A and B," unless otherwise indicated. In the appended claims, the terms "including" and "in which" are used as the plain-English equivalents of the respective terms "comprising" and "wherein". Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

In various examples, the components, controllers, processors, units, engines, or tables described herein can include, among other things, physical circuitry or firmware stored on a physical device. As used herein, "processor" means any type of computational circuit such as, but not limited to, a microprocessor, a microcontroller, a graphics processor, a digital signal processor (DSP), or any other type of processor or processing circuit, including a group of processors or multi-core devices.

The term "horizontal" as used in this document is defined as a plane parallel to the conventional plane or surface of a substrate, such as that underlying a wafer or die, regardless of the actual orientation of the substrate at any point in time. The term "vertical" refers to a direction perpendicular to the horizontal as defined above. Prepositions, such as "on," "over," and "under" are defined with respect to the conventional plane or surface being on the top or exposed surface of the substrate, regardless of the orientation of the substrate; and while "on" is intended to suggest a direct contact of one structure relative to another structure which it lies "on" (in the absence of an express indication to the contrary); the terms "over" and "under" are expressly intended to identify a relative placement of structures (or layers, features, etc.), which expressly includes—but is not limited to—direct contact between the identified structures unless specifically identified as such. Similarly, the terms "over" and "under" are not limited to horizontal orientations, as a structure may be "over" a referenced structure if it is, at some point in time, an outermost portion of the construction under discussion, even if such structure extends vertically relative to the referenced structure, rather than in a horizontal orientation.

The terms "wafer" and "substrate" are used herein to refer generally to any structure on which integrated circuits are formed, and also to such structures during various stages of integrated circuit fabrication. The following detailed description is, therefore, not to be taken in a limiting sense, and the scope of the various embodiments is defined only by the appended claims, along with the full scope of equivalents to which such claims are entitled.

Various embodiments according to the present disclosure and described herein include memory utilizing a vertical structure of memory cells (e.g., NAND strings of memory cells). As used herein, directional adjectives will be taken relative a surface of a substrate upon which the memory cells are formed (i.e., a vertical structure will be taken as extending away from the substrate surface, a bottom end of the vertical structure will be taken as the end nearest the substrate surface and a top end of the vertical structure will be taken as the end farthest from the substrate surface).

As used herein, directional adjectives, such as horizontal, vertical, normal, parallel, perpendicular, etc., can refer to relative orientations, and are not intended to require strict adherence to specific geometric properties, unless otherwise noted. For example, as used herein, a vertical structure need not be strictly perpendicular to a surface of a substrate, but may instead be generally perpendicular to the surface of the substrate, and may form an acute angle with the surface of the substrate (e.g., between 60 and 120 degrees, etc.).

In some embodiments described herein, different doping configurations may be applied to a source-side select gate (SGS), a control gate (CG), and a drain-side select gate (SGD), each of which, in this example, may be formed of or at least include polysilicon, with the result such that these tiers (e.g., polysilicon, etc.) may have different etch rates when exposed to an etching solution. For example, in a process of forming a monolithic pillar in a 3D semiconductor device, the SGS and the CG may form recesses, while the SGD may remain less recessed or even not recessed. These doping configurations may thus enable selective etching into the distinct tiers (e.g., SGS, CG, and SGD) in the 3D semiconductor device by using an etching solution (e.g., tetramethylammonium hydroxide (TMCH)).

Operating a memory cell, as used herein, includes reading from, writing to, or erasing the memory cell. The operation of placing a memory cell in an intended state is referred to herein as "programming," and can include both writing to or erasing from the memory cell (e.g., the memory cell may be programmed to an erased state).

According to one or more embodiments of the present disclosure, a memory controller (e.g., a processor, controller, firmware, etc.) located internal or external to a memory device, is capable of determining (e.g., selecting, setting, adjusting, computing, changing, clearing, communicating, adapting, deriving, defining, utilizing, modifying, applying, etc.) a quantity of wear cycles, or a wear state (e.g., recording wear cycles, counting operations of the memory device as they occur, tracking the operations of the memory device it initiates, evaluating the memory device characteristics corresponding to a wear state, etc.)

According to one or more embodiments of the present disclosure, a memory access device may be configured to provide wear cycle information to the memory device with each memory operation. The memory device control circuitry (e.g., control logic) may be programmed to compensate for memory device performance changes corresponding to the wear cycle information. The memory device may receive the wear cycle information and determine one or more operating parameters (e.g., a value, characteristic) in response to the wear cycle information.

It will be understood that when an element is referred to as being "on," "connected to" or "coupled with" another element, it can be directly on, connected, or coupled with the other element or intervening elements may be present. In contrast, when an element is referred to as being "directly on," "directly connected to" or "directly coupled with" another element, there are no intervening elements or layers present. If two elements are shown in the drawings with a line connecting them, the two elements can be either be coupled, or directly coupled, unless otherwise indicated.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact discs and digital video disks), magnetic cassettes, memory cards or sticks, random access memories (RAMs), read only memories (ROMs), solid state drives (SSDs), Universal Flash Storage (UFS) device, embedded MMC (eMMC) device, and the like.

EXAMPLES

Example 1 is a method for memory system programming, comprising: receiving, by a programming appliance, a command file comprising a first pre-generated digital signature, the first pre-generated digital signature associated with a memory system, with a first command and with a first memory system counter value; and sending, by the programming appliance and to the memory system, a first command message comprising the first command and the first pre-generated digital signature.

In Example 2, the subject matter of Example 1 optionally includes verifying, by the memory system, the first pre-generated digital signature using a current memory system counter value and a memory system cryptographic key; and executing, by the memory system, the first pre-generated digital signature.

In Example 3, the subject matter of any one or more of Examples 1-2 optionally includes wherein the command file further comprises a second pre-generated digital signature, the second pre-generated digital signature associated with the memory system, with a second command, and with a second memory system counter value after the first memory system counter value, the method further comprising: after sending the first command message to the memory system, sending to the memory system a second command message comprising the second command and the second pre-generated digital signature.

In Example 4, the subject matter of Example 3 optionally includes wherein the command file further comprises a third pre-generated digital signature, the third pre-generated digital signature associated with a third command and with a third memory system counter value after the second memory system counter value, the method further comprising: after sending the second command message, determining that command sequence data indicates the third command; and sending to the memory system a third command message comprising the third command and the third pre-generated digital signature.

In Example 5, the subject matter of any one or more of Examples 1-4 optionally includes wherein the command file comprises a second pre-generated digital signature, the second pre-generated digital signature associated with the first command and with a second memory system counter value different than the first memory system counter value, further comprising: querying the memory system, by the programming appliance, to receive a current memory system counter value; and selecting, by the programming appliance, the first pre-generated digital signature based at least in part on the current memory system counter value and the first memory system counter value.

In Example 6, the subject matter of any one or more of Examples 1-5 optionally includes querying the memory system to receive a first current memory system counter value; determining that the first current memory system counter value is less than the first memory system counter value; querying the memory system to receive a second current memory system counter value greater than the first current memory system counter value; and determining that the second current memory system counter value is equivalent to the first memory system counter value.

In Example 7, the subject matter of any one or more of Examples 1-6 optionally includes querying the memory system to receive a first current memory system counter value; determining that the first current memory system counter value is less than the first memory system counter value; and sending to the memory system an instruction to increment the memory system counter.

In Example 8, the subject matter of any one or more of Examples 1-7 optionally includes wherein the command file comprises a first sequence of pre-generated digital signatures corresponding to a first command sequence and a second sequence of pre-generated digital signatures corresponding to a second command sequence, the first sequence of pre-generated digital signatures comprising the first pre-generated digital signature.

In Example 9, the subject matter of Example 8 optionally includes wherein the second sequence of pre-generated digital signatures also comprises the first pre-generated digital signature.

Example 10 is a system for programming memory, comprising: a programming appliance configured to execute operations comprising: receiving a command file comprising a first pre-generated digital signature, the first pre-generated digital signature associated with a memory system, with a first command and with a first memory system counter value; and sending to the memory system, a first command message comprising the first command and the first pre-generated digital signature.

In Example 11, the subject matter of Example 10 optionally includes wherein the command file further comprises a second pre-generated digital signature, the second pre-generated digital signature associated with the memory system, with a second command, and with a second memory system counter value after the first memory system counter value, and wherein the programming appliance is further configured to execute operations comprising: after sending the first command message to the memory system, sending to the memory system a second command message comprising the second command and the second pre-generated digital signature.

In Example 12, the subject matter of Example 11 optionally includes wherein the command file further comprises a third pre-generated digital signature, the third pre-generated digital signature associated with a third command and with a third memory system counter value after the second memory system counter value, and wherein the programming appliance is further configured to execute operations comprising: after sending the second command message, determining that command sequence data indicates the third command; and sending to the memory system a third command message comprising the third command and the third pre-generated digital signature.

In Example 13, the subject matter of any one or more of Examples 10-12 optionally includes wherein the command file comprises a second pre-generated digital signature, the second pre-generated digital signature associated with the first command and with a second memory system counter value different than the first memory system counter value, and wherein the programming appliance is further configured to execute operations comprising: querying the memory system to receive a current memory system counter value; and selecting the first pre-generated digital signature based at least in part on the current memory system counter value and the first memory system counter value.

In Example 14, the subject matter of any one or more of Examples 10-13 optionally includes wherein the programming appliance is further configured to execute operations comprising: querying the memory system to receive a first current memory system counter value; determining that the first current memory system counter value is less than the first memory system counter value; querying the memory system to receive a second current memory system counter value greater than the first current memory system counter value; and determining that the second current memory system counter value is equivalent to the first memory system counter value.

In Example 15, the subject matter of any one or more of Examples 10-14 optionally includes wherein the programming appliance is further configured to execute operations comprising: querying the memory system to receive a first current memory system counter value; determining that the first current memory system counter value is less than the first memory system counter value; and sending to the memory system an instruction to increment the memory system counter.

In Example 16, the subject matter of any one or more of Examples 10-15 optionally includes wherein the command file comprises a first sequence of pre-generated digital signatures corresponding to a first command sequence and a second sequence of pre-generated digital signatures corresponding to a second command sequence, the first sequence of pre-generated digital signatures comprising the first pre-generated digital signature.

In Example 17, the subject matter of Example 16 optionally includes wherein the second sequence of pre-generated digital signatures also comprises the first pre-generated digital signature.

In Example 18, the subject matter of any one or more of Examples 10-17 optionally includes the memory system, wherein the memory system is programmed to perform operations comprising: verifying, by the memory system, the first pre-generated digital signature using a current memory system counter value and a memory system cryptographic key; and executing, by the memory system, the first pre-generated digital signature.

Example 19 is a non-transitory computer readable medium comprising instructions thereon that, when executed by at least one processor, cause the at least one processor to execute operations comprising: receiving a command file comprising a first pre-generated digital signature, the first pre-generated digital signature associated with a memory system, with a first command and with a first memory system counter value; and sending to the memory system, a first command message comprising the first command and the first pre-generated digital signature.

In Example 20, the subject matter of Example 19 optionally includes wherein the command file further comprises a second pre-generated digital signature, the second pre-generated digital signature associated with the memory system, with a second command, and with a second memory system counter value after the first memory system counter value, the medium further comprising instructions that, when executed by the at least one processor, cause the at least one processor to execute operations comprising: after sending the first command message to the memory system, sending to the memory system a second command message comprising the second command and the second pre-generated digital signature.

The above description is intended to be illustrative, and not restrictive. For example, the above-described examples (or one or more aspects thereof) may be used in combination with each other. Other embodiments can be used, such as by one of ordinary skill in the art upon reviewing the above description. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A method for memory system programming, comprising:
   receiving, by a programming appliance, a command file comprising a plurality of pre-generated digital signatures, the plurality of pre-generated digital signatures comprising:
      a first pre-generated digital signature associated with a first command and with a first value of a first memory system counter at a first memory system; and
      a second pre-generated digital signature associated with the first command and with a second value of the first memory system counter;
   querying the first memory system, by the programming appliance, to receive a first current memory system counter value;
   selecting, by the programming appliance, the first pre-generated digital signature based at least in part on the first current memory system counter value; and
   sending, by the programming appliance, to the first memory system, a first command message comprising the first command and the first pre-generated digital signature.

2. The method of claim 1, further comprising:
   verifying, by the first memory system, the first pre-generated digital signature using a current value of the first memory system counter and a first memory system cryptographic key; and
   executing, by the first memory system, the first command.

3. The method of claim 1, wherein the command file further comprises a third pre-generated digital signature, the third pre-generated digital signature associated with the first memory system, with a second command, and with a third value of the first memory system counter greater than the first value of the first memory system counter, the method further comprising:
   after sending the first command message to the first memory system, sending to the first memory system a second command message comprising the second command and the third pre-generated digital signature.

4. The method of claim 3, wherein the command file further comprises a fourth pre-generated digital signature, the fourth pre-generated digital signature associated with a third command and with a third value of the first memory system counter greater than the third value of the first memory system counter, the method further comprising:
   after sending the second command message, determining that command sequence data indicates the third command; and
   sending to the first memory system a third command message comprising the third command and the fourth pre-generated digital signature.

5. The method of claim 1, further comprising:
   determining that the first current memory system counter value is less than the first value of the first memory system counter;
   querying the first memory system to receive a second current memory system counter value of the first memory system counter greater than the first current memory system counter value; and
   determining that the second current memory system counter value is equivalent to the first value of the first memory system counter.

6. The method of claim 1, further comprising:
   determining that the fit current memory system counter value is less than the first value of the first memory system counter; and
   sending to the first memory system an instruction to increment the first memory system counter.

7. The method of claim 1, wherein the command file comprises a first sequence of pre-generated digital signatures corresponding to a first command sequence and a second sequence of pre-generated digital signatures corresponding to a second command sequence, the first sequence of pre-generated digital signatures comprising the first pre-generated digital signature.

8. The method of claim 7, wherein the second sequence of pre-generated digital signatures also comprises the first pre-generated digital signature.

9. A system for programming memory, comprising:
   a programming appliance comprising at least one processor, the programming appliance configured to execute operations comprising:
      receiving a command file comprising a plurality of pre-generated digital signatures, the plurality of pre-generated digital signatures comprising:
         a first pre-generated digital signature associated with a first command and with a first value of a first memory system counter at a first memory system; and a second pre-generated digital signature associated with the first command and with a second value of the first memory system counter;

querying the first memory system, by the programming appliance, to receive a first current memory system counter value;

selecting, by the programming appliance, the first pre-generated digital signature based at least in part on the first current memory system counter value; and sending, to the first memory system, a first command message comprising the first command and the first pre-generated digital signature.

10. The system of claim 9, wherein the command file further comprises a third pre-generated digital signature, the third pre-generated digital signature associated with the first memory system, with a second command, and with a third value of the first memory system counter greater than the first value of the first memory system counter, and wherein the programming appliance is further configured to execute operations comprising:

after sending the first command message to the first memory system, sending to the first memory system a second command message comprising the second command and the third pre-generated digital signature.

11. The system of claim 10, wherein the command file further comprises a fourth pre-generated digital signature, the fourth pre-generated digital signature associated with a third command and with a third value of the first memory system counter greater than the third value of the first memory system counter, and wherein the programming appliance is further configured to execute operations comprising:

after sending the second command message, determining that command sequence data indicates the third command; and sending to the first memory system a third command message comprising the third command and the third pre-generated digital signature.

12. The system of claim 9, wherein the programming appliance is further configured to execute operations comprising:

determining that the first current memory system counter value is less than the first value of the first memory system counter;

querying the first memory system to receive a second current memory system counter value of the first memory system counter greater than the first current memory system counter value; and determining that the second current memory system counter value is equivalent to the first value of the first memory system counter.

13. The system of claim 9, wherein the programming appliance is further configured to execute operations comprising:

determining that the first current memory system counter value is less than the first value of the first memory system counter; and sending to the first memory system an instruction to increment the first memory system counter.

14. The system of claim 9, wherein the command file comprises a first sequence of pre-generated digital signatures corresponding to a first command sequence and a second sequence of pre-generated digital signatures corresponding to a second command sequence, the first sequence of pre-generated digital signatures comprising the first pre-generated digital signature.

15. The system of claim 14, wherein the second sequence of pre-generated digital signatures also comprises the first pre-generated digital signature.

16. The system of claim 9, further comprising the first memory system, wherein the first memory system is programmed to perform operations comprising:

verifying, by the first memory system, the first pre-generated digital signature using a current value of the first memory system counter and a first memory system cryptographic key; and executing, by the first memory system, the first command.

17. A non-transitory computer readable medium comprising instructions thereon that, when executed by at least one processor, cause the at least one processor to execute operations comprising:

receiving a command file comprising a plurality of pre-generated digital signatures, the plurality of pre-generated digital signatures comprising:

a first pre-generated digital signature associated with a first command and with a first value of a first memory system counter at a first memory system; and a second pre-generated digital signal associated with the first command and with a second value of the first memory system counter;

querying the first memory system to receive a first current memory system counter value;

selecting the first pre-generated digital signature based at least in part on the first current memory system counter value; and sending to the first memory system, a first command message comprising the first command and the first pre-generated digital signature.

18. The non-transitory computer readable medium of claim 17, wherein the command file further comprises a third pre-generated digital signature, the third pre-generated digital signature associated with the first memory system, with a second command, and with a third value of the first memory system counter greater than the first value of the first memory system counter, the medium further comprising instructions that, when executed by the at least one processor, cause the at least one processor to execute operations comprising:

after sending the first command message to the first memory system, sending to the first memory system a second command message comprising the second command and the third pre-generated digital signature.

19. The method of claim 1, further comprising:

querying, by the programming appliance, a second memory system to receive a first current memory system counter value of the second memory system;

selecting, by the programming appliance, the second pre-generated digital signature based at least in part on the first current memory system counter value of the second memory system; and sending, by the programming appliance, to the second memory system, a second command message comprising the first command and the second pre-generated digital signature.

20. The system of claim 9, the operations further comprising:

querying a second memory system to receive a first current memory system counter value of the second memory system;

selecting the second pre-generated digital signature based at least in part on the first current memory system counter value of the second memory system; and sending to the second memory system, a second command message comprising the first command and the second pre-generated digital signature.

\* \* \* \* \*